(12) United States Patent
Scott et al.

(10) Patent No.: US 8,769,355 B2
(45) Date of Patent: Jul. 1, 2014

(54) USING BUILT-IN SELF TEST FOR PREVENTING SIDE CHANNEL SECURITY ATTACKS ON MULTI-PROCESSOR SYSTEMS

(75) Inventors: Jeffrey W. Scott, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 267 days.

(21) Appl. No.: 13/169,664

(22) Filed: Jun. 27, 2011

(65) Prior Publication Data

US 2012/0331309 A1 Dec. 27, 2012

(51) Int. Cl.
*G11C 29/00* (2006.01)

(52) U.S. Cl.
USPC .......................................... 714/719; 714/763

(58) Field of Classification Search
USPC ................. 714/719, 763, 739, 735, 736, 718; 713/189, 193
See application file for complete search history.

(56) References Cited

U.S. PATENT DOCUMENTS

| | | | |
|---|---|---|---|
| 5,073,891 A | 12/1991 | Patel | |
| 5,383,143 A | 1/1995 | Crouch et al. | |
| 5,673,388 A | 9/1997 | Murthi et al. | |
| 5,680,544 A | 10/1997 | Edmondson et al. | |
| 5,940,588 A | 8/1999 | Kikinis | |
| 6,477,251 B1 * | 11/2002 | Szrek et al. | 380/46 |
| 6,601,197 B1 | 7/2003 | Naritake | |
| 6,678,853 B1 | 1/2004 | Brummel | |
| 6,724,894 B1 | 4/2004 | Singer | |
| 6,766,455 B1 | 7/2004 | Ryan, Jr. | |
| 6,807,646 B1 | 10/2004 | Williams et al. | |
| 6,983,407 B2 | 1/2006 | Appinger et al. | |
| 7,412,468 B2 * | 8/2008 | Butler | 708/250 |
| 7,472,224 B1 | 12/2008 | Klass et al. | |
| 7,555,787 B2 | 6/2009 | Clercq | |
| 7,636,858 B2 * | 12/2009 | Khan et al. | 713/189 |
| 7,702,705 B2 | 4/2010 | Suzuki | |
| 7,778,413 B2 * | 8/2010 | Hwang | 380/29 |
| 7,853,012 B2 | 12/2010 | Sarangarajan et al. | |
| 7,899,190 B2 | 3/2011 | Gebotys | |
| 8,407,452 B2 * | 3/2013 | Yoshimi | 712/36 |
| 2002/0104052 A1 * | 8/2002 | Nolles et al. | 714/733 |
| 2004/0019798 A1 * | 1/2004 | Ishii | 713/193 |

(Continued)

OTHER PUBLICATIONS

Agarwal, A. et al., "A Novel Fault Tolerant Cache to Improve Yield in Nanometer Technologies," IEEE Proceedings of the 10th International On-Line Testing Symposium 2004, Jul. 12-14, 2004, pp. 149-154.

(Continued)

*Primary Examiner* — Esaw Abraham
*Assistant Examiner* — Osman Alshack (57) ABSTRACT

A data processing system having a first processor, a second processor, a local memory of the second processor, and a built-in self-test (BIST) controller of the second processor which performs BIST memory accesses on the local memory of the second processor and which includes a random value generator is provided. The system can perform a method including executing a secure code sequence by the first processor and performing, by the BIST controller of the second processor, BIST memory accesses to the local memory of the second processor in response to the random value generator. Performing the BIST memory accesses is performed concurrently with executing the secure code sequence.

19 Claims, 4 Drawing Sheets

(56) References Cited

U.S. PATENT DOCUMENTS

| | | | |
|---|---|---|---|
| 2004/0078402 A1* | 4/2004 | Butler | 708/252 |
| 2004/0230882 A1 | 11/2004 | Huott et al. | |
| 2005/0055596 A1 | 3/2005 | Abe et al. | |
| 2005/0265547 A1* | 12/2005 | Strasser et al. | 380/44 |
| 2006/0107156 A1 | 5/2006 | Lee et al. | |
| 2006/0184987 A1* | 8/2006 | Allen et al. | 725/100 |
| 2007/0047623 A1 | 3/2007 | Eun et al. | |
| 2007/0127431 A1 | 6/2007 | Eun et al. | |
| 2008/0263414 A1* | 10/2008 | Saito et al. | 714/718 |
| 2009/0161722 A1 | 6/2009 | Gorman et al. | |
| 2009/0245013 A1 | 10/2009 | Chandra et al. | |
| 2009/0327664 A1 | 12/2009 | Yoshimi | |
| 2009/0327680 A1* | 12/2009 | Dale et al. | 713/2 |

OTHER PUBLICATIONS

Agnola, L. et al., "Self-Adaptive Mechanism for Cache Memory Reliability Improvement," IEEE 13th International Symposium on Design and Diagnostics of Electronics Circuits and Systems 2010, Apr. 14-16, 2010, pp. 117-118.

Benso, A. et al., "Online and Offline BIST in IP-Core Design," IEEE Design & Test of Computers, vol. 18, No. 5, pp. 92-99, Sep.-Oct. 2001, doi:10.1109/54.953276.

Li, Y. et al, "Casp: Concurrent Autonomous Chip Self-Test Using Store Test Patterns," 2008 Design, Automation and Test in Europe, Mar. 10-14, 2008, 6 pages.

Ramaswamy, S. et al., "Customizable Fault Tolerant Caches for Embedded Processors," IEEE International Conference on Computer Design 2006, Oct. 1-4, 2007, pp. 108-113.

Tehranipour, M.H. et al., "An Efficient BIST Method for Testing of Embedded SRAMs," 2001 IEEE International Symposium on Circuits and Systems, Jan. 2001, vol. 5, pp. 73-76.

U.S. Appl. No. 13/589,580 filed Aug. 20, 2012, entitled "Random Timeslot Controller for Enabling Built-In Self Test Module".

U.S. Appl. No. 13/690,888, filed Nov. 30, 2012, entitled "Random Access of a Cache Portion Using an Access Module".

Non-Final Office Action mailed Sep. 10, 2013 for U.S. Appl. No. 13/589,580, 31 pages.

Final Office Action mailed Apr. 18, 2014 for U.S. Appl. No. 13/589,580, 27 pages.

\* cited by examiner

USING BUILT-IN SELF TEST FOR PREVENTING SIDE CHANNEL SECURITY ATTACKS ON MULTI-PROCESSOR SYSTEMS

FIELD

This disclosure relates generally to computing systems and, more particularly, to computing systems implementing security countermeasures using built-in self test circuitry.

BACKGROUND

Computing systems often require operations to be carried out in a secure manner. For embedded computing devices and for pervasive systems, security of operation is often crucial. To ensure operations and communications are secure, such systems employ cryptographic methods.

The implementation of such a cryptographic method must itself be secure. However, cryptographic methods are subject to attacks. One type of non-invasive attack on computing devices implementing cryptographic methods is known as a side-channel attack. A side channel attack is any attack on the computing device based on information gained from the physical implementation of the computing system, rather than using a brute force attack or exploiting a theoretical weakness in the cryptographic algorithms. For example, timing information, power consumption, electromagnetic leaks, and sound can be used to as sources of information that can be used to break a system.

A power consumption attack, for example, involves the monitoring of the power consumption of one or more components of a device while the device executes a cryptographic method. One example of a power consumption attack is a differential power analysis. The data derived from monitoring power consumption of the device, combined with some knowledge of the operations being carried out by the device, can be used to derive the secret information that is part of the cryptographic method. It is therefore desirable to provide a mechanism for disguising a power profile of a computing device executing secure code in order to prevent a side-channel attack that uses power consumption information.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

A mechanism is provided for generating a random power profile of a computing device executing secure code in order to prevent a side-channel attack that uses power consumption information. In a computing device having two or more processors, a processor that is not executing secure code performs random accesses of local memory thereby obscuring power consumption due to the processor executing the secure code. Memory accesses are performed by built-in self-test logic modified to also perform random data pattern generation and data address generation. The memory access obscures the power consumption of the processor accessing the secure code due to the significant power consumption of memory array access. Random data, random address and random times for reads and writes to the memory aid in providing power fluctuations.

Side channel attacks pose a significant threat to computing devices executing secure code (e.g., cryptographic systems). Such attacks involve analysis of related signals generated when an encrypted message is produced in order to obtain information which simplifies analysis of the cryptographic system under attack. One type of side channel attack is a power consumption analysis (e.g., differential power analysis (DPA)). Power consumption analysis involves observation and analysis of fluctuations on the power line of a cryptographic device to determine details of the cryptographic code (e.g., crypto keys, and the like) used by the device.

Power consumption attacks allow an attacker to extract secret protected information from a supposedly secure cryptographic device by measuring variations in power consumption over time, and then analyzing this information. Any type of secure cryptographic device where such power variations are accessible is potentially susceptible to such an attack. The attack is based on the principle that as a processor executing cryptographic code performs cryptographic functions, such as encryption or signing, transistors in the processor switch on and off, which changes the amount of current drawn from the source supplying power to the processor. An attacker can correlate the current changes with data being processed and the cryptographic code (e.g., crypto keys) being used.

By randomly altering the power consumption of a computing device performing cryptographic functions, an attacker attempting to perform a power consumption, or similar side channel attack, will not be able to perform the needed analysis to determine crypto keys and the like. Embodiments of the present invention alter power consumption of the computing device by having an existing processor that is not executing cryptographic code perform random memory accesses. These random memory accesses are performed by an existing built-in self-test (BIST) controller configured to generate random data patterns and random memory addresses, in addition to typical BIST memory test functions. The random data patterns and addresses are used to access areas of a memory local to the processor that is not executing cryptographic code (e.g., local cache memory). Since memory arrays are among the most significant power consuming devices of a processing system, varying the data, accesses and idle times of the memory arrays with the BIST will provide a random power profile to an attacker. Further, since only an idle processor and that processor's local memories are used, the BIST memory access process does not interfere with the processing of the cryptographic code by the other processor.

Figure 1:
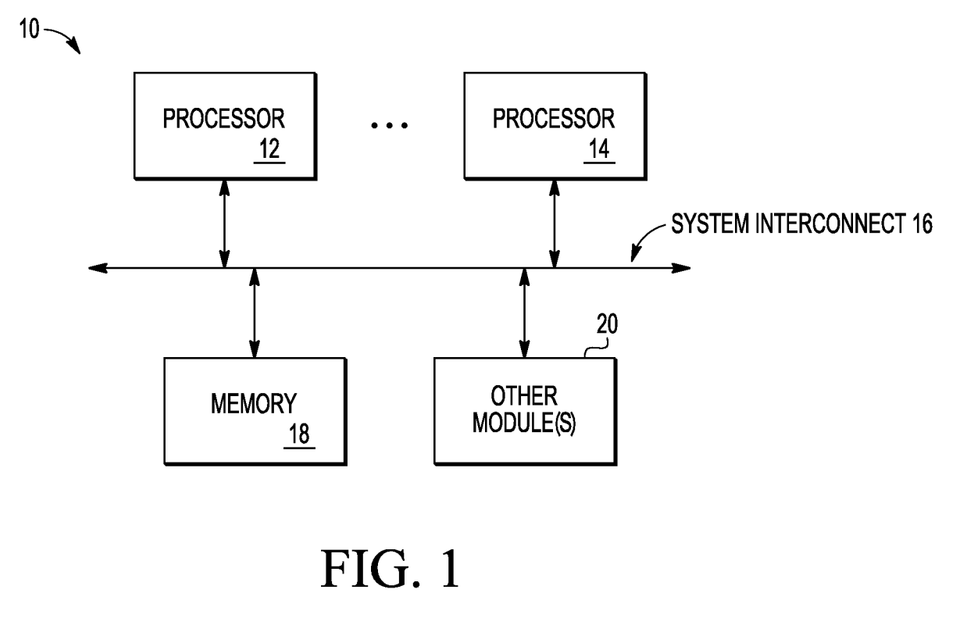
FIG. 1 is a simplified block diagram illustrating one example of a data processing system usable with embodiments of the present invention.

FIG. 1 is a simplified block diagram illustrating one example of a data processing system usable with embodiments of the present invention. System 10 provides processors 12 and 14 bidirectionally coupled to a system interconnect 16. System interconnect 16 provides communication between the processors and memory 18 and other modules 20 (e.g., peripherals, input/output devices and the like). System interconnect 16 can be implemented as a system bus, or alternatively, as a cross-bar switch or other type of interconnect fabric. Memory 18 is bidirectionally coupled to system interconnect 16 and can be any type of memory, such as, for example, read only memory (ROM), random access memory (RAM), and the like. Other modules 20 are bidirectionally coupled to the system interconnect and may include any type and number of other modules, such as, for example, peripherals including input/output (I/O) devices, timers, memories, and the like.

Embodiments of the present invention may use more, less or different functional blocks than the units illustrated within system 10. Further, one or more of the functional blocks of system 10 may include an external port for communication external to system 10. In operation, processors 12 and 14, memory 18, and other modules 20 operate as known in the art of multiple processor systems. While system 10 is illustrated with two processors, alternate embodiments may include any plurality of processors. Any of the processors may be the same, or may be different.

Figure 2:
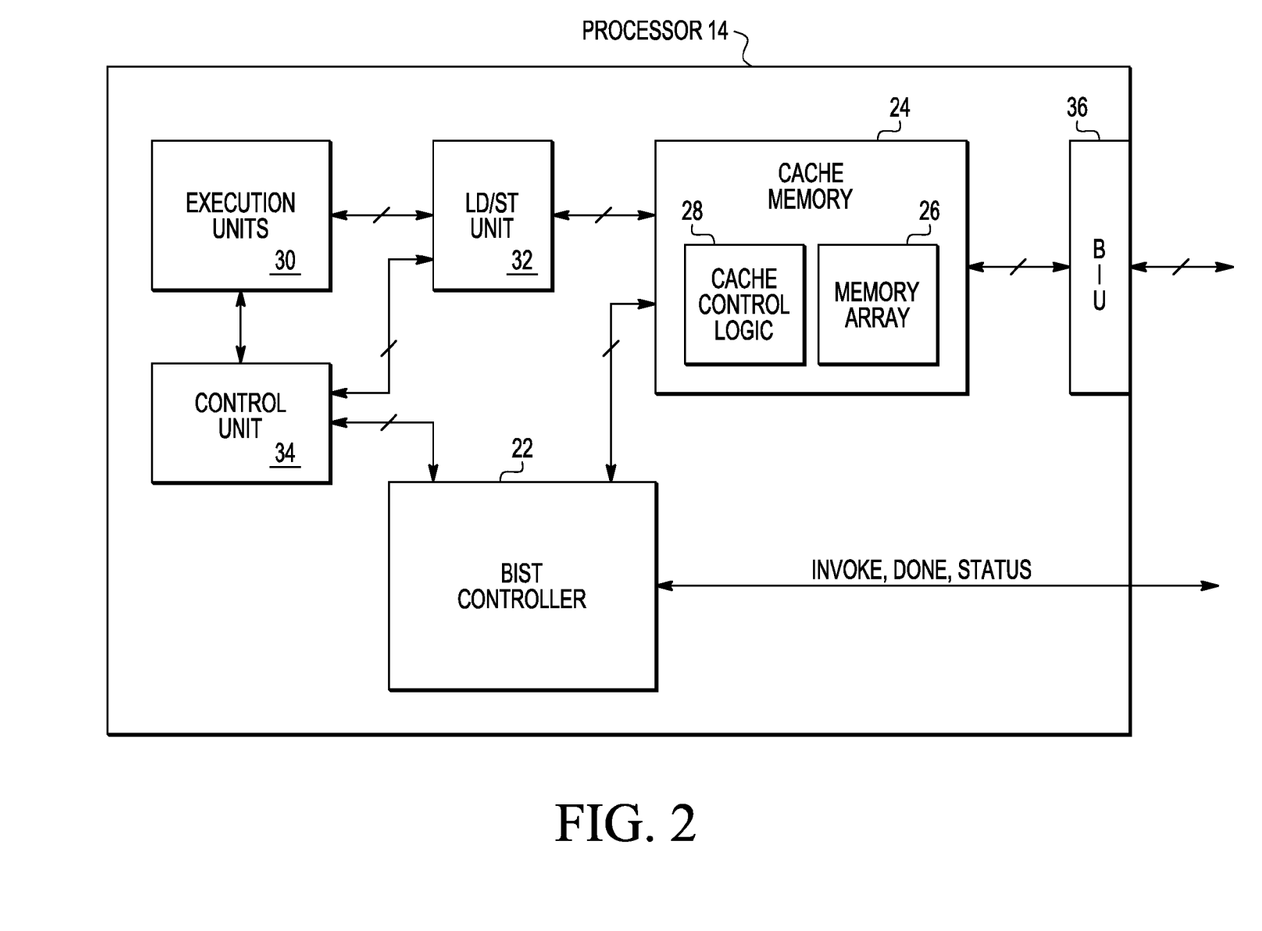
FIG. 2 is a simplified block diagram illustrating one example of a processor incorporating a BIST controller according to embodiments of the present invention.

FIG. 2 is a simplified block diagram illustrating one example of a processor incorporating a BIST controller according to embodiments of the present invention. Processor 14 includes a BIST controller 22 coupled to a cache memory 24 that is local to processor 14. As will be discussed in greater detail below, BIST controller 22 is configured to perform both traditional BIST memory access functions related to memory testing (e.g., writing data to memory locations and comparing the stored data with the data written), as well as random BIST memory access functions designed to cause a random power profile during secure code operations by processor 12 of system 10 (e.g., writing random data to random memory locations (loading and storing) as well as reading data from random memory locations). Processor 14 also includes one or more execution units 30, that can execute instructions provided to processor 14. Execution units 30 are coupled to load/store unit 32 that provides memory access operations to and from the execution units. Control unit 34 is coupled to execution units 30, load/store unit 32 and BIST controller 22. Control unit 34 directs operations of components of processor 14.

Cache memory 24 provides a local memory accessible to processor 14. Cache memory 24 includes a memory array 26 that is configured to store data sequences in addressable data locations (e.g., cache lines). Cache control logic 28 provides access functions to the memory array. Cache control logic 28 interfaces with BIST controller 22 and load/store unit 32 to provide the access functions to the memory array. Communication to and from processor 14 is provided using bus interface unit (BIU) 36. BIU 36 can fetch instructions, read operands, write information to system memory, and the like.

BIST controller 22 is configured for bidirectional communications with external devices. Such communications can include signals to invoke and stop BIST operations, status indications and the like.

Figure 3:
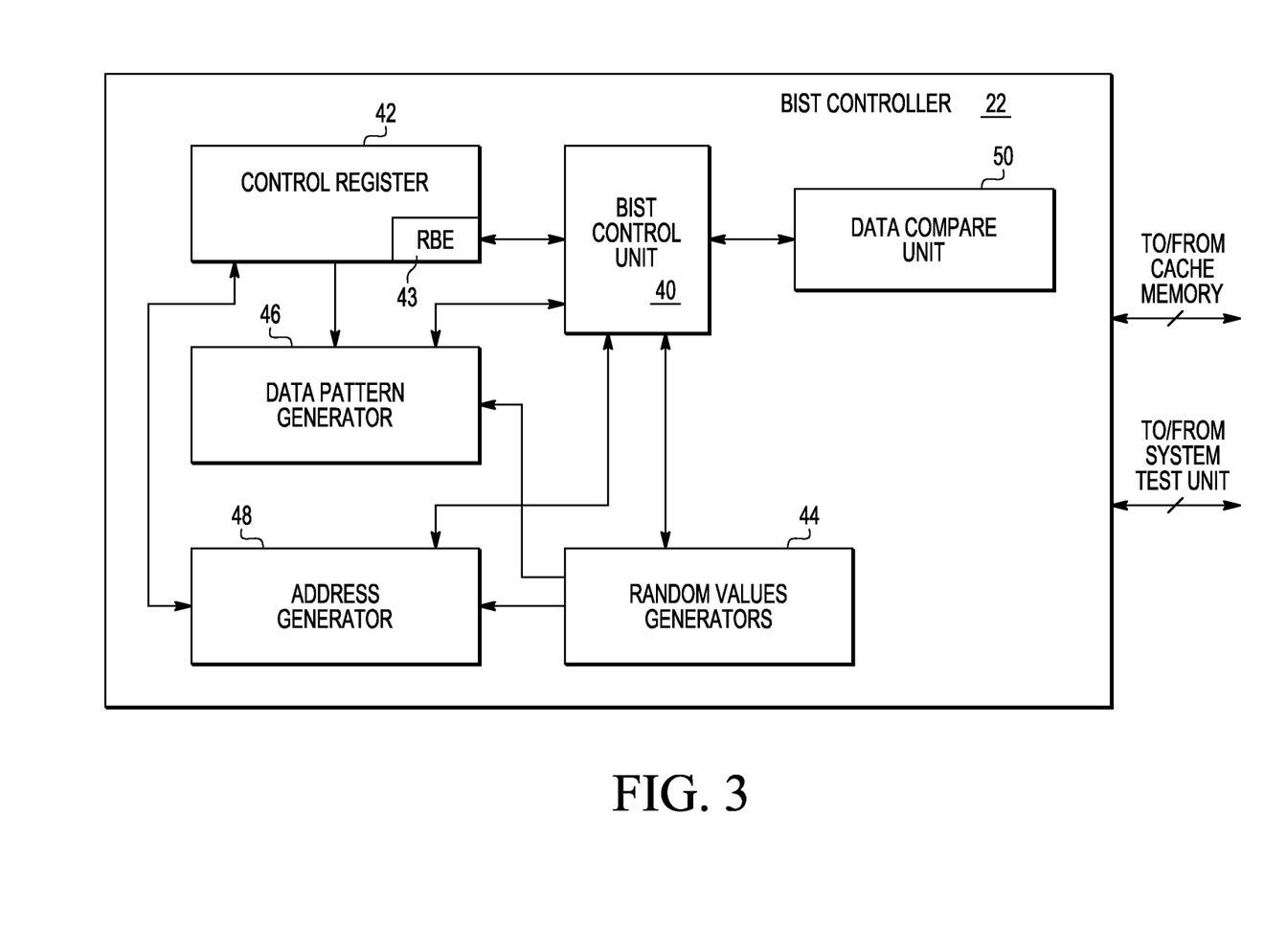
FIG. 3 is a simplified block diagram illustrating one example of a built-in self-test controller configured to implement embodiments of the present invention.

FIG. 3 is a simplified block diagram illustrating one example of a built-in self-test controller configured to implement embodiments of the present invention. BIST controller 22 includes a BIST control unit 40 that controls data flow operations of the BIST controller. Coupled to the BIST control unit are a control register 42 that includes a random BIST enable bit (RBE) 43. The random BIST enable bit can be set by another processor that is performing execution of a secure code sequence. For example, processor 12, which is performing execution of a secure code sequence, can assert a random BIST enable bit of processor 14 in a memory mapped control register. Processor 12 has storage access to the RBE of processor 14 and the BIST of processor 14 can also access the bit.

In other embodiments, the RBE bit can be set by other means than the first processor (e.g., by another master having access to the control register comprising the RBE). In response to the RBE being set, the BIST control unit initiates random BIST memory access.

The RBE is a mechanism for a processor executing a secure code sequence to inform a second processor of this execution so that random BIST memory access can be performed by the second processor. Alternatively, the first processor can inform the second processor by providing a selected interrupt request to the second processor. In another alternative, the second processor can determine whether the first processor is executing a secure code by monitoring access to memory locations of the secure code or data related to the secure code, and upon access by the first processor begin random BIST memory access. When the first processor stops accessing the memory locations of the secure code or data related to the secure code, the second processor can stop performing random BIST memory access. In a further alternative, the second processor can begin performing random BIST memory access in response to a system event.

A random value generator 44, coupled to BIST control unit 40, generates random values usable by other components of BIST controller 22. The random value generator can be implemented by a variety of random value generators known in the art. Random values generated by random value generator are made available to data pattern generator 46, address generator 48 and BIST control unit 40, which are all coupled to the random value generator.

Data pattern generator 46 can use a random value as a seed to generate a random data pattern that is provided to BIST control unit 40 for storing to a memory location. The data pattern generator is configured to perform both traditional BIST data pattern generation for built-in self-test functions (e.g., pre-determined data values or data sequences) as well as the random BIST data pattern generation of embodiments of the present invention. Random value seeds can be provided by random value generator 44 to data pattern generator 46 for each desired data pattern, or a previously generated random data pattern can be used as a seed for generating a next random data pattern, as desired for a particular implementation. Similarly, address generator 48 can use a random value generated by random value generator 44 as a seed to generate an initial random memory address that is provided to BIST control unit 40 for designating a memory location at which to perform a memory access. Subsequent random addresses can be generated using additional random values generated by random value generator 44 as a seed or using a previously generated random memory location as the seed. Address generator 48 is configured to perform both traditional BIST address generation for BIST testing as well as the random BIST address generation discussed above.

BIST control unit 40 uses an address generated by address generator 48 to store data generated by data pattern generator 46 in a location corresponding to the address of a memory local to the processor (e.g., memory array 26 of cache memory 24). Addresses and data values can be either values used for standard BIST memory testing or the random BIST data patterns and addresses generated by embodiments of the present invention. When writing standard BIST memory test values, data compare unit 50 is used to compare the values written with those stored in the memory (e.g., the value is read back from the memory location by BIST control unit 40 and compared by data compare unit 50). If the values do not match, this may indicate the presence of a defective memory cell. When writing the random BIST data of embodiments of the present invention, data compare unit 50 is not needed to determine whether the stored value is accurate since the purpose of this operation is not to test the memory but to utilize it for power consumption purposes.

Figure 4:
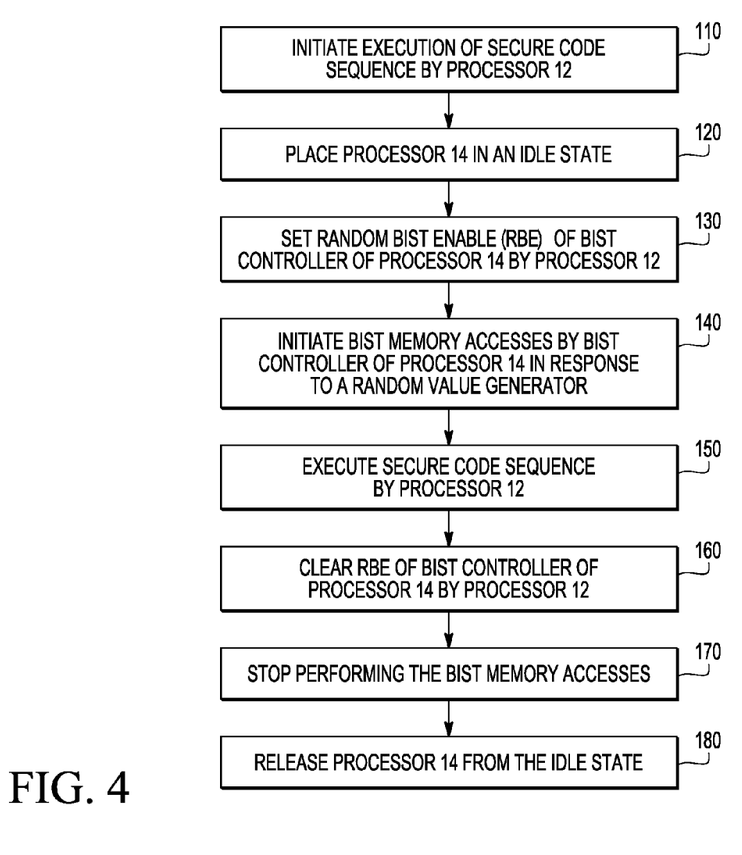
FIG. 4 is a simplified flow diagram illustrating a process for generating a random power consumption profile, according to an embodiment of the present invention.

FIG. 4 is a simplified flow diagram illustrating a process for generating a random power consumption profile, according to an embodiment of the present invention. The process begins with an initiation of execution of a secure code sequence by a first processor (e.g., processor 12) (110). Such a secure code sequence can include, for example, cryptographic code having crypto keys, and the like. As the processor performs initiation tasks, the processor requests that a second processor (e.g., processor 14) be placed in an idle state, if necessary (as discussed below) (120). If the secure code sequence is performed by the first processor during, for example, boot sequence operations, then the second processor may already be idle and thus will not need to be actively placed in an idle state. On the other hand, should the secure code sequence be performed at a time when the second processor is performing other tasks, the second processor will be put into an idle state (e.g., interrupting current operations and storing current operational state information) in order to perform BIST-directed operations discussed below.

The first processor also sets a random BIST enable bit (RBE) in a control register of the BIST controller (e.g., control register 42 of BIST controller 22) of the second processor (130). Assertion of the RBE enables the second processor's BIST controller to perform random BIST operations. In response to the RBE being set, random BIST memory access is initiated (140). A random value generator (e.g., 44) of the BIST controller generates one or more random values that are used to generate random data patterns (e.g., by data pattern generator 46) and random memory addresses (e.g., by address generator 48). The random data patterns can be loaded or stored at the random data addresses of a memory local to the second processor (e.g., memory array 26 of cache memory 24). Randomly selecting between load and store operations can aid in disguising power consumption since, in general, memory stores consume more power than a memory load. In addition, the BIST controller can perform the loading/storing tasks at random intervals, determined by the BIST control unit in response to random values generated by the random value generator. Varying the idle time in this manner can further randomize the power consumption profile of the computing device. The BIST controller can also perform read accesses to random data addresses at random intervals, as provided, for example, in one embodiment discussed below. While the second processor is performing the random BIST memory access, the first processor proceeds with executing the secure code sequence (150).

Once the first processor has completed the secure code sequence, it is no longer necessary for the second processor to continue to perform random BIST memory accesses. The first processor can then clear the RBE of the second processor's BIST controller (160). In response to the clearing of the RBE, the second processor stops performing BIST memory access (170). The second processor is then released from the idle state, if necessary (180).

In one embodiment, the second processor may be requested to perform random BIST memory access immediately following a reset state of system 10. In this case, the local memory of the second processor typically contains no current information, and thus random BIST memory access may consist of a series of memory store operations which write random data values to random addresses. When completion of the secure code sequence by the first processor occurs, the second processor may be reset, and begin execution from a reset state.

In another embodiment, the second processor may be executing applications at the time it is requested to begin performing random BIST memory accesses, in conjunction with the first processor beginning execution of a secure code sequence. The second processor can be informed of such a request, for example, by an interrupt request generated by the first processor or by monitoring of the state of the RBE control bit for requests. In this situation, it will typically be desired for the second processor to temporarily interrupt execution of the application and to later continue with execution of the application once the first processor has completed execution of the secure code sequence. In this case, the second processor can be placed in an idle state, in which no instruction execution is performed (e.g., 120). Control is then given to BIST controller 22 for performing the random BIST memory accesses. Since the local memory contains information related to the ongoing execution of the second processor, the BIST controller may be controlled (or restricted) to only performing memory read operations for the random BIST memory accesses, and not performing memory write operations which would disturb the state of the suspended application.

This embodiment contrasts with normal memory BIST operations in which a pattern of data is written to pre-determined memory locations and then read back for performing data value comparisons to ensure the proper operation of the memory storage locations. Since no modification of the memory locations are made, the second processor is able to resume execution of the interrupted (suspended) application once the first processor has completed the secure code sequence. No reset or invalidation of the local memory of the second processor is performed.

By now it should be appreciated that there has been provided a first embodiment of the present invention that includes a first processor, a second processor having a cache memory and a built-in self-test (BIST) controller coupled to the cache memory of the second processor. The BIST controller includes an address generator configured to generate memory addresses for the cache memory, a data pattern generator configured to generate data patterns for storage into the cache, control circuitry configured to store data generated by the data pattern generator at memory addresses of the cache generated by the address generator and to load data from the cache, a data compare unit coupled to the control circuitry and configured to determine if data values read from the cache match expected data values, a random value generator coupled to the address generator, and storage circuitry configured to store a random BIST enable (RBE) indicator. The first data processor is configured to assert the RBE indicator upon initiating execution of a secure code sequence, and the control circuitry is configured, in response to assertion of the RBE indicator by the first processor, to perform memory accesses to addresses of the cache generated by the address generator in response to the random value generator.

In one aspect of the above embodiment, the control circuitry is configured to continuously perform memory accesses to the memory addresses of the cache memory, while the RBE indicator is asserted. In a further aspect, while the RBE indicator is asserted, the memory accesses are continuously performed at random time intervals that are determined in response to the random value generator. In another aspect, the control circuitry is configured to stop performing memory accesses to memory addresses of the cache in response to deassertion of the RBE indicator. Further, the second processor can be placed into an idle state prior to asserting the RBE indicator. Further still, the second processor can be released from the idle state after deasserting the RBE indicator.

In another aspect of the above embodiment, when the RBE indicator is not asserted, the control circuitry is configured to: generate non-random data patterns by the data pattern generator, generate non-random memory addresses of the cache by the address generator, and store the non-random data patterns to the non-random memory addresses; read data values from the cache; and provide the read data values from the cache to the data compare unit for comparison with the expected data values. In still another aspect of the above embodiment, the control circuitry is configured to store data patterns generated by the data pattern generator in response to the random value generator for at least a portion of the memory accesses performed to the memory addresses of the cache generated by the address generator in response to the random value generator.

Another embodiment of the present invention provides a data processing system having a first processor, a second processor, a local memory of the second processor and a BIST controller of the second processor that performs BIST memory accesses on the local memory of the second processor and stores a random BIST enable (RBE) indicator. The data processing system performs: initiating execution of a secure code sequence by the first processor; asserting the RBE indicator; the BIST controller of the second processor initiating, in response to assertion of the RBE indicator, BIST memory accesses to the local memory of the second processor in response to a random value generator; and the first processor executing the secure code sequence concurrently with the BIST controller of the second processor performing the BIST memory accesses to the local memory of the second processor.

In one aspect of the above embodiment, the second processor is placed in an idle state prior to asserting the RBE indicator. In a further aspect, the RBE indicator is deasserted after executing the secure code sequence, and in response to deassertion of the RBE indicator stopping the BIST controller of the second processor from performing the BIST memory accesses to the local memory of the second processor. In still a further aspect, the second processor is released from the idle state in response to deasserting the RBE indicator.

In another aspect of the above embodiment, performing the BIST memory accesses to the local memory the second processor further includes providing random values generated by the random value generator to an address generator of the BIST controller, wherein the address generator uses the random values to generate random addresses of the local memory for the BIST memory accesses. In a further aspect, each of the BIST memory accesses to the local memory is characterized as a read access.

In another aspect of the above embodiment, performing the BIST memory accesses to the local memory of the second processor includes providing random values generated by the random value generator to a data pattern generator of the BIST controller, wherein the data pattern generator uses the random values to generate random data for storage in the local memory for the BIST memory accesses. In still another aspect of the above embodiment, performing the BIST memory accesses to the local memory of the second processor by the BIST controller includes using random values generated by the random value generator to generate the BIST memory accesses at random time intervals.

In another aspect of the above embodiment, when the RBE indicator is deasserted, the method further includes performing BIST memory accesses to the local memory of the second processor by the BIST controller without using the random value generator, reading data values from the local memory by the BIST controller, and comparing the read data values with expected data values by the BIST controller. In still another aspect of the above embodiment, the local memory of the second processor is characterized as a cache of the second processor.

Another embodiment of the present invention provides a method performed by a data processing system having a first processor, a second processor, a local memory of the second processor, and a BIST controller of the second processor that performs BIST memory accesses on the local memory of the second processor and includes a random value generator. The method includes executing a secure code sequence by the first processor, and performing BIST memory accesses to the local memory of the second processor, by the BIST controller of the second processor, in response to the random value generator. The BIST memory accesses are performed concurrently with the executing of the secure code sequence. In one aspect of the above embodiment, performing the BIST memory accesses to the local memory of the second processor in response to the random value generator includes using random values generated by the random value generator to generate at least one of random addresses of the local memory for the BIST memory accesses or random data for storage in the local memory for the BIST memory accesses.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 35 may be located on a same integrated circuit as masters 12 and 14 or on a separate integrated circuit or located within another peripheral or slave discretely separate from other elements of system 10. Peripheral 18 and I/O circuitry 16 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system, comprising:
  a first processor;
  a second processor, the second processor having a cache;
  a built-in self-test (BIST) controller coupled to the cache of the second processor, wherein the BIST controller comprises:
    an address generator configured to generate memory addresses for the cache of the second processor;
    a data pattern generator configured to generate data patterns for storage into the cache;
    control circuitry configured to store data generated by the data pattern generator at memory addresses of the cache generated by the address generator and to load data from the cache;
    a data compare unit coupled to the control circuitry configured to determine if data values read from the cache match expected data values;
    a random value generator coupled to the address generator; and
    storage circuitry configured to store a random BIST enable (RBE) indicator, wherein, the first data processor is configured to assert the RBE indicator upon initiating execution of a secure code sequence, and the control circuitry is configured to, in response to assertion of the RBE indicator by the first processor, perform memory accesses to memory addresses of the cache generated by the address generator in response to the random value generator.

2. The data processing system of claim 1, wherein the control circuitry is configured to continuously perform memory accesses to memory addresses of the cache generated by the address generator in response to the random value generator while the RBE indicator is asserted.

3. The data processing system of claim 2, wherein the memory accesses are continuously performed to the memory addresses of the cache generated by the address generator in response to the random value generator at random time intervals while the RBE indicator is asserted, wherein the random time intervals are determined in response to the random value generator.

4. The data processing system of claim 2, wherein the control circuitry is configured to stop performing memory accesses to memory addresses of the cache generated by the address generator in response to the random value generator in response to deassertion of the RBE indicator.

5. The data processing system of claim 4, wherein the second processor is placed into an idle state prior to asserting the RBE indicator.

6. The data processing system of claim 5, wherein the second processor is released from the idle state after deasserting the RBE indicator.

7. The data processing system of claim 1, wherein when the RBE indicator is not asserted, the control circuitry is configured to:
   store data patterns generated by the data pattern generator without using the random value generator to memory addresses of the cache generated by the address generator without using the random value generator,
   read data values from the cache, and
   provide the read data values from the cache to the data compare unit for comparison with the expected data values.

8. The data processing system of claim 1, wherein the control circuitry is configured to store data patterns generated by the data pattern generator in response to the random value generator for at least a portion of the memory accesses performed to the memory addresses of the cache generated by the address generator in response to the random value generator.

9. In a data processing system having a first processor, a second processor, a local memory of the second processor, and a built-in self-test (BIST) controller of the second processor which performs BIST memory accesses on the local memory of the second processor and stores a random BIST enable (RBE) indicator, a method comprising:
   initiating, by the first processor, execution of a secure code sequence;
   asserting the RBE indicator;
   in response to assertion of the RBE indicator, initiating, by the BIST controller of the second processor, BIST memory accesses to the local memory of the second processor in response to a random value generator; and
   executing, by the first processor, the secure code sequence concurrently with the BIST controller of the second processor performing BIST memory accesses to the local memory of the second processor in response to the random value generator.

10. The method of claim 9, further comprising:
    prior to asserting the RBE indicator, placing the second processor in an idle state.

11. The method of claim 10, further comprising:
    after executing the secure code sequence, deasserting the RBE indicator; and
    in response to the deasserting the RBE indicator, the BIST controller of the second processor stopping the performing BIST memory accesses to the local memory of the second processor in response to the random value generator.

12. The method of claim 11, further comprising:
    after deasserting the RBE indicator, releasing the second processor from the idle state.

13. The method of claim 9, wherein the performing the BIST memory accesses to the local memory of the second processor in response to the random value generator by the BIST controller comprises:
    providing random values generated by the random value generator to an address generator of the BIST controller, wherein the address generator uses the random values to generate random addresses of the local memory for the BIST memory accesses.

14. The method of claim 13, wherein each of the BIST memory accesses to the local memory is further characterized as a read access.

15. The method of claim 9, wherein the performing the BIST memory accesses to the local memory of the second processor in response to the random value generator by the BIST controller comprises:
    providing random values generated by the random value generator to a data pattern generator of the BIST controller, wherein the data pattern generator uses the random values to generate random data for storage in the local memory for the BIST memory accesses.

16. The method of claim 9, wherein the performing the BIST memory accesses to the local memory of the second processor in response to the random value generator by the BIST controller comprises:
    using random values generated by the random value generator to generate the BIST memory accesses at random time intervals.

17. The method of claim 9, wherein when the RBE indicator is deasserted, the method further comprises:
    performing BIST memory accesses to the local memory of the second processor by the BIST controller without using the random value generator;
    reading, by the BIST controller, data values from the local memory; and
    comparing, by the BIST controller, the read data values with expected data values.

18. The method of claim 9, wherein the local memory of the second processor is further characterized as a cache of the second processor.

19. In a data processing system having a first processor, a second processor, a local memory of the second processor, and a built-in self-test (BIST) controller of the second processor which performs BIST memory accesses on the local memory of the second processor and includes a random value generator, a method comprising: executing, by the first processor, a secure code sequence; and performing, by the BIST controller of the second processor, BIST memory accesses to the local memory of the second processor in response to the random value generator, wherein the performing the BIST memory accesses is performed concurrently with the executing the secure code sequence, wherein the performing the BIST memory accesses to the local memory of the second processor in response to the random value generator by the BIST controller comprises: using random values generated by the random value generator to generate at least one of random addresses of the local memory for the BIST memory accesses or random data for storage in the local memory for the BIST memory accesses.

* * * * *